United States Patent Office 2,902,449
Patented Sept. 1, 1959

2,902,449

AQUEOUS LUBRICANT COMPOSITION

Konrad Höpfner and Ernst Götte, Dusseldorf, Germany, assignors to Dehydag, Deutsche Hydrierwerke G.m. b.H., Dusseldorf, Germany No Drawing. Application November 30, 1953
Serial No. 395,297

Claims priority, application Germany December 1, 1952

6 Claims. (Cl. 252—33.4)

The present invention relates to novel lubricants and lubrication methods, more particularly for metal parts and metal working.

It has been found that electrically neutral organic salts obtained by reaction of equimolar amounts of anionic and cationic compounds are very high-grade lubricants either when used by themselves or as additives to other lubricants. They are useful for the lubrication of machine parts and other metal parts, fine mechanical parts, and the like. Furthermore, they can be employed for the preparation of lubricant emulsions, refrigerant emulsions and solutions, such as they are used in the working of metals, whether it be a cutting or non-cutting operation. Among the former are boring, grinding, polishing, cutting, and so on, among the latter, drawing, rolling, extruding, and the like.

The organic electrically neutral salts are characterized by the fact that they can easily be precipitated on the metal faces from their aqueous solutions or emulsions and, consequently, exhibit excellent lubricating properties. They are economical in use and bring about an improvement in the surface quality, especially in phosphated materials.

When they are used as boring and cutting oils, they provide smooth cutting faces, do not attack the cut pieces, and do not lead to subsequent rusting.

In preparing the electrically neutral salts for the purposes of the present invention, we start from cationic onium compounds, e.g. ammonium-, sulfonium-, phosphonium compounds, and the like. These onium compounds should contain at least one aliphatic, cycloaliphatic, or alkyl aromatic radical with at least 6, up to about 20 carbon atoms, and over; they may also contain suitable mixed radicals. The hydrocarbon radicals may also contain hetero atoms or hetero atom groups.

Of practical interest are first of all the known ammonium compounds which are derived from ammonia or from organic nitrogen bases, thus for instance: trimethyloctylammoniumchloride, trimethyldodecylammonium chloride, trimethyloctadecylammoniummethosulfate, dimethyldodecylbenzylammoniumchloride, dimethylcyclohexylalkylalkylammoniumchlorides with alkyl radicals $C_{10}$–$C_{22}$ or mixtures, dodecylpyridiniumchloride, hexadecylpyridiniumbisulfate, etc. The alkyl radicals may contain hereto atoms e.g. oxygen, sulfur or nitrogen, or hetero atom groups derived therefrom, or substituents.

Anionic compounds which may be used in preparing the neutral salts to be employed according to the invention are the known compounds of the aliphatic, cycloaliphatic, or alkyl aromatic series or mixed types of these series, which contain in the molecule at lease one lipophilic radical with at least 6 carbon atoms, and at least one acid, salt-forming group, which is neutralized by inorganic or organic bases capable of forming watersoluble salts. Compounds of this type are for instance: alkylsulfates, alkylsulfonates, alkylbenzenesulfonates.

From these starting materials we make the electrically neutral salts to be used in accordance with our invention by known methods, such as precipitation of equimolar amounts of aqueous solutions of the anionic compounds with aqueous solutions of the cationic compounds. The hydrocarbon radicals of the two components may be similar or different. The precipitates may be used directly for the purposes of the invention or, after purification, removal of the salts, and drying.

The organic electrically neutral salts can be used as such for the lubrication, or they may be admixed to known lubricants in amounts of 0.05–50% and more. When they are used as sole lubricants, they may be in the form of their aqueous solutions or emulsions in concentrations of 0.05–20% or more, preferably 0.5–10%. When they are used together with known lubricants, these may be mineral oils and waxes, vegetable oils and fats, animal oils and fats, metal soaps of all kinds, artificial resins, graphite, inorganic gels of oxides or hydroxides of amphoteric metals, and the like. These mixtures may be worked up to form different kinds of lubricating agents.

In the cutting operations of the metal-working art, the electrically neutral salts according to the invention are mostly used in the form of their solutions or emulsions with known lubricants. Their concentrations as mentioned before are preferably between 0.05 and 20%. For improving their water-solubility, it is advantageous to use an excess amount of the anionic component.

Further additions, which improve the properties of the lubricants, may also be used, such as mineral, vegetable, or animal oils or fats, metal soaps, acid-fast anionic or non-ionic surface active compounds, which may act as wetting or emulsifying agents, furthermore, rust-proofing agents and antioxidants, thickening agents, viscosity increasing agents, e.g. organic disulfo- or sulfocarboxylic imides or their salts. In some cases we may use, instead of the electrically neutral salts, the mixtures of their starting components.

The invention will now be described in a few examples but it should be understood that these are given by way of illustration and not of limitation and that many changes in the details may be made without departing from the spirit of the invention.

Example 1

2.5 kg. of an organic electrically neutral salt made by reacting equimolar amounts of the sodium salt of alkylsulfuric acid (alkyl radicals $C_{12}$–$C_{16}$) and dimethyl cyclohexyl octadecyl ammonium chloride, are dissolved in 100 liters water with a 10% excess amount of the anionic component. The solution can be used as a cooling and lubricating agent in the cutting operations of metals and alloys for instance in the lathe operations.

Example 2

1.5 kg. mineral lubricant, 0.5 kg. of the electrically neutral salt made according to Example 1, and 0.2 kg. sodium salt of alkylsulfuric acid (alkyl radicals $C_{12}$–$C_{16}$) are emulsified in 100 liters water. The solution is used in grinding metal parts and yields a fine polish, without causing a smearing of the corundum stone.

Example 3

2.5 kg. of an electrically neutral salt made by reacting equimolar amounts of sodium octadecylbenzene sulfonate and dimethyl cyclohexyl octadecyl ammonium chloride, and 0.5 sodium dodecylbenzene sulfonate, are dissolved in 100 liters of water. The solution is very well adapted for use in the cutting of threads. The cut surfaces are perfectly smooth. The metal parts are not attacked and do not exhibit any aftereffects of rusting.

Example 4

3 kg. of lubricating oil, 1.5 kg. of a salt as described in Example 1 and 0.2 kg. dialkylbenzene disulfimide sodium (alkyl radicals $C_{10}$–$C_{12}$) are homogeneously worked up while warm. A lubricating oil is thus obtained which has very good lubricating properties and lends itself excellently for the lubrication of metal parts.

Example 5

2.5 kg. of an organic electrically neutral salt made of equimolar amounts of the sodium salt of alkylsulfuric acid ($C_{10}$–$C_{12}$) and dodecylpyridinium sulfate, to which a light excess of the anionic component has been added for better solubility, are dissolved in 100 liters of water. Phosphated iron parts are placed in this solution. After a short time, the parts are taken out, dried, and are now ready to undergo a drawing process.

Example 6

2 kg. mineral oil, 0.2 kg. sodium salt of alkylsulfuric acid (alkyl radicals $C_{16}$–$C_{18}$) and 0.5 kg. of the electro-neutral salt made according to Example 5 are emulsified in 100 liters of water. The emulsion thus obtained is a very useful lubricant in the rolling of light or heavy metals or alloys.

Example 7

1 kg. of a neutral salt made from the sodium salt of equimolar amounts of oleyl sulfuric acid and dimethyl cyclohexyl octadecyl ammonium chloride and 0.2 kg. dialkylbenzene disulfimide sodium (alkyl radicals $C_{12}$–$C_{16}$) are dissolved in 100 liters of water. With the thus obtained solution, uncoated or phosphated steel parts are oiled and cold drawn.

What we claim is:

1. An aqueous emulsion for lubricating metal parts in machining and non-cutting shaping operations comprising an aqueous dispersion of from about 0.05%–20% by weight of said emulsion of a neutral salt prepared by reacting equimolar amounts of (1) a water soluble salt of an organic sulfur containing acid selected from the group consisting of alkyl substituted sulfuric acid and alkyl substituted benzene sulfonic acids in which the alkyl radical contains at least 10 carbon atoms and not more than 18 carbon atoms and (2) a quaternary ammonium soluble salt of an inorganic acid in which the pentavalent nitrogen atom of said salt is substituted with at least one alkyl radical containing from 10 to 22 carbon atoms whereby the inorganic anion of said salt is replaced by the anion of said organic sulfur containing acid in said dispersion.

2. An aqueous preparation for lubricating metal parts in machining and non-cutting shaping operations, said preparation containing in 100 liters of water 2.5 kgs. of an organic electrically neutral salt made by reacting equimolar amounts of the sodium salt of alkylsulfuric acid in which the alkyl radical contains at least 12 and not more than 16 carbon atoms and dimethyl cyclohexyl octadecyl ammonium chloride with a 10% excess of the first-mentioned compound.

3. An aqueous dispersion for lubricating metal parts in machining and non-cutting shaping operations, containing in 100 liters of water 0.5 kg. of an organic electrically neutral salt made by reacting equimolar amounts of the sodium salt of alkylsulfuric acid in which the alkyl radical contains at least 12 and not more than 16 carbon atoms and dimethyl cyclohexyl octadecyl ammonium chloride, 0.2 kg. sodium salt of alkylsulfuric acid in which the alkyl radical contains at least 12 and not more than 16 carbon atoms, and 1.5 kgs. of a mineral lubricant.

4. An aqueous solution for lubricating metal parts in machining and non-cutting shaping operations, said solution containing in 100 liters of water 2.5 kgs. of an electrically neutral salt made by reacting equimolar amounts of sodium octadecylbenzene sulfonate and dimethyl cyclohexyl octadecyl ammonium chloride, and 0.5 kg. sodium dodecylbenzene sulfonate.

5. An aqueous solution for use in drawing operations of metal parts, said solution containing in 100 liters of water 2.5 kg. of an organic electrically neutral salt made of equimolar amounts of the sodium salt of alkylsulfuric acid in which the alkyl radical contains at least 10 and not more than 12 carbon atoms and dodecylpyridinium sulfate, to which a light excess of the first-mentioned component has been added for better solubility.

6. An aqueous emulsion for lubricating metal parts in non-cutting shaping operations, said emulsion containing in 100 liters of water 0.5 kg. of an organic electrically neutral salt made of equimolar amounts of the sodium salt of alkylsulfuric acid in which the alkyl radical contains at least 10 and not more than 12 carbon atoms and dodecylpyridinium sulfate, to which a light excess of the first-mentioned component has been added for better solubility, 2 kg. mineral oil, and 0.2 kg. sodium salt of alkylsulfuric acid, in which the alkyl radical contains at least 16 and not more than 18 carbon atoms.

References Cited in the file of this patent

UNITED STATES PATENTS

| | | |
|---|---|---|
| 2,162,454 | Guthmann | June 13, 1939 |
| 2,257,752 | Lincoln et al. | Oct. 7, 1941 |
| 2,329,731 | Spring | Sept. 21, 1943 |
| 2,453,690 | Bray | Nov. 16, 1948 |

OTHER REFERENCES

Fieser and Fieser: "Organic Chemistry," Heath & Co., Boston, 1944, p. 229.